United States Patent
Webster et al.

(10) Patent No.: US 6,768,926 B2
(45) Date of Patent: Jul. 27, 2004

(54) CONTROLLER, CONTROLLED DEVICE, CONTROL METHOD, AND CONTROL SYSTEM

(75) Inventors: Rodney Gordon Webster, Tokyo (JP); Mayuko Tanaka, Tokyo (JP); Makoto Sano, Tokyo (JP); Makoto Aikawa, Tokyo (JP)

(73) Assignee: Hitachi, Ltd. (JP)

( * ) Notice: Subject to any disclaimer, the term of this patent is extended or adjusted under 35 U.S.C. 154(b) by 183 days.

(21) Appl. No.: 09/832,311

(22) Filed: Apr. 9, 2001

(65) Prior Publication Data

US 2002/0107583 A1 Aug. 8, 2002

(30) Foreign Application Priority Data

Feb. 2, 2001 (JP) .......................... 2001-026254

(51) Int. Cl.[7] .............................................. G05B 11/01
(52) U.S. Cl. ............................... 700/19; 700/3; 700/9; 700/87; 710/10; 710/13
(58) Field of Search ............................. 700/2, 3, 9, 19, 700/86, 87, 4, 5, 20, 21, 82; 710/10, 13; 709/208, 209, 211; 711/161, 162; 370/489, 438

(56) References Cited

U.S. PATENT DOCUMENTS

| 6,052,750 | A | * | 4/2000 | Lea | 710/72 |
| 6,160,796 | A | * | 12/2000 | Zou | 370/257 |
| 6,199,136 | B1 | * | 3/2001 | Shteyn | 710/129 |
| 6,298,069 | B1 | * | 10/2001 | Prabhu et al. | 370/463 |
| 6,389,466 | B1 | * | 5/2002 | Zondag | 709/221 |
| 6,684,401 | B1 | * | 1/2004 | Zou | 725/80 |
| 6,694,349 | B1 | * | 2/2004 | Zou | 709/202 |

FOREIGN PATENT DOCUMENTS

| JP | 07200326 A | * | 8/1995 | ........... G06F/11/00 |
| WO | WO 99/06910 | | 2/1999 | |
| WO | WO 00/21200 | | 4/2000 | |

OTHER PUBLICATIONS

"IEEE Standard for a High Performance Serial Bus," IEEE Std 1394–1995 (Aug. 30, 1996), Abstract, pp. vii–viii.
"Specification of the Home Audio/Video Interoperability (HAVi) Architecture," HAVi Specificaiton 1.0 (Jan. 18, 2000), pp. I–VII.
"Information technology—Microprocessor systems—Control and Status Registers (CSR) Architecture for microcomputer buses," ISO/IEC 13213:1994(E) [ANSI/IEEE Std 1212, 1994 Edition], pp. vii–x/.
"Draft Standard for a Control and Status Registers (CSR) Architecture for microcomputer buses," IEEE P1212 Draft 0.3 (Aug. 27, 1999), Abstract, p. ix.
"The HAVi Architecture, Version 0.8," HAVi Architecture, XP002089719, No. 8, May 15, 1998, pp. 6–18.

* cited by examiner

Primary Examiner—Ramesh Patel
Assistant Examiner—Crystal J. Barnes
(74) Attorney, Agent, or Firm—Townsend and Townsend and Crew LLP

(57) ABSTRACT

The present invention provides a method and a device, for use in a network over which data may be exchanged among devices, for providing data (executable code unit) for controlling other devices. To achieve this, a DCM Manager of a controller FAV first collects device control data from configROMs of the devices. The DCM Manager uses this information to search for the newest DCM for a new controlled device BAV that has been connected to a network. The DCM Manager reads the newest BAV1_DCM_b from the configROM of the BAV to install the DCM.

13 Claims, 15 Drawing Sheets

FIG. 15

| KEY NAME | KEY |
|---|---|
| HAVi_DCM_UNIT_DIRECTORY_KEY | 0x3E |
| HAVi_DCM_IDENTIFIER_KEY | 0x3F |
| (0X39 TO 0X3D ARE THE SAME VALUES AS THOSE DEFINED BY HAVi SPECIFICATION) ||

FIG. 16

| KEY NAME | KEY |
|---|---|
| HAVi_DCM_LIST_UNIT_DIRECTORY_KEY | 0x3E |
| HAVi_DCM_UNIT_DIRECTORY_KEY | 0x3F |
| HAVi_DCM_IDENTIFIER_KEY (EXTENSION KEY) | 0x00 00 00 |
| (0X39 TO 0X3D ARE THE SAME VALUES AS THOSE DEFINED BY HAVi SPECIFICATION) ||

CONTROLLER, CONTROLLED DEVICE, CONTROL METHOD, AND CONTROL SYSTEM

BACKGROUND OF THE INVENTION

The present invention relates to a control system in which a controller and a plurality of controlled devices are connected via a network. In particular, the present invention relates to a controller, controlled devices, a control method, and a control system in which the controlled devices store data used by the controller to control the controlled devices.

A study is under way for a system in which AV devices and data processing devices are interconnected with an IEEE1394 serial bus, which allows data transmission via isochronous communication and control signal transmission via asynchronous communication, for communication among those devices. The IEEE1394 serial bus is defined in "IEEE Std 1394-1995" under the title "IEEE Standard for a High Performance Serial Bus".

In addition, "Specification of the Home Audio/Video Interoperability (HAVi) (hereinafter abbreviated as HAVi specification)" is disclosed as a communication protocol for controlling AV devices on a 1394 serial bus. Also described in this specification is a method for devices to provide a code unit that is data for controlling them from other devices.

A device conforming to the HAVi specification has "Self Describing Device Data (hereinafter abbreviated as SDD data)" for describing its own function to other devices. SDD data, which is detailed in the HAVi specification, is stored in the configROM in the HAVi_Unit_Directory to allow other devices to reference it via the 1394 serial bus. The format of the configROM, an address space that may be referenced using asynchronous communication via the 1394 serial bus, is defined in "ISO/IEC 13213:1994 Control and Status Register (CSR) Architecture for Microcomputer Buses (IEEE Std 1212-1994" and "IEEE P1212 Draft 1.0, Draft Standard for a Control and Status Registers (CSR) Architecture for Microcomputer Buses, Oct. 18, 1999". In addition to the data structures defined by these specifications, directories and leaves of the vendor specific Vendor_Info (vendor information) may be defined.

The HAVi specification classifies AV devices into two types: controllers and controlled devices. A "Base AV(BAV) Device (hereinafter abbreviated as BAV)", a typical controlled device, has SDD data and a DCM and uploads them to a controller. A "Full AV (FAV) Device (hereinafter abbreviated FAV)", a typical controller, provides the HAVi system components and a Java run-time environment.

A BAV, which conforms to the HAVi specification, has a Device Control Module (hereinafter abbreviated as DCM) code unit stored in its SDD data. When an FAV downloads a DCM code unit and installs it in itself, a DCM is generated. The DCM is a program module for controlling the corresponding device. In addition, a Functional Control Module (hereinafter abbreviated FCM), which controls the sub-unit(s) of the corresponding unit, is also generated in some cases. An application on the FAV uses the DCMs and the FCMs to control the devices in the network system.

The "Device Control Module Manager (hereinafter abbreviated DCM Manager)" in the FAV manages the DCMs on a HAVi-compliant network system as well as their installation. When the network is reset on the 1394 serial bus, the DCM Managers on the network system negotiate with each other to select the DCM Manager, called a final leader, which performs DCM processing on behalf of the DCM Managers.

In the HAVi network system described above, a plurality of AV devices (FAVs) on which HAVi system components are running are connected via the network. The devices on this network work together under control of the HAVi protocol to execute the functions of the devices.

On the other hand, a device (BAV) on which the HAVi system components are not running stores therein a DCM code unit to allow other devices to access this device. This allows a FAV to download the DCM code unit of the BAV and to install it into the FAV.

In the system described above, the DCM must be sometimes updated to increase the performance of the BAV function or to fix bugs. In this case, if the URL for obtaining the DCM is specified in the SDD data of the BAV, a newer DCM may be downloaded from a wide area network such as the Internet.

In this situation, if a device that is connectable to an external network is not in the HAVi network, a newer DCM is not available for use.

SUMMARY OF THE INVENTION

It is an object of the present invention to provide a method for making a newer DCM available in the HAVi network without connecting to an external network.

To solve this problem, the method according to the present invention has typically a configuration as described below.

That is, in a control system in which one or more controllers and a plurality of controlled devices are connected by a network, a controlled device (BAV) includes, in an externally readable memory area (SDD data), data for use by a controller (FAV) to control via the network a second controlled device (BAV) connectable to the network, and the controller (FAV) obtains the data from the controlled device (BAV) to generate a program for controlling the second controlled device.

To solve the above problem, the method according to the present invention uses a typical configuration described above. An updated DCM for controlling some other device, if stored in the configROM of a device, allows the updated DCM to be made available on an HAVi network even when no device can be connected to an external network.

BRIEF DESCRIPTION OF THE DRAWINGS

FIG. 15 is a diagram showing the configROM in which a vendor directory and leaves are used in an embodiment of the present invention.

FIG. 16 is a diagram showing the configROM in which HAVi_DCM_List_Unit_Directory and HAVi_DCM_Unit_Directory are used in an embodiment of the present invention.

DESCRIPTION OF THE EMBODIMENTS

Some embodiments of the present invention will be described in detail with reference to the attached drawings.

First, referring to FIG. 11, DCM processing will be described in which a DCM Manager 212 of an FAV 210 in a network system shown in FIG. 1 acts as a final leader to install the DCM of a BAV 240 into the FAV it self.

Figure 1:
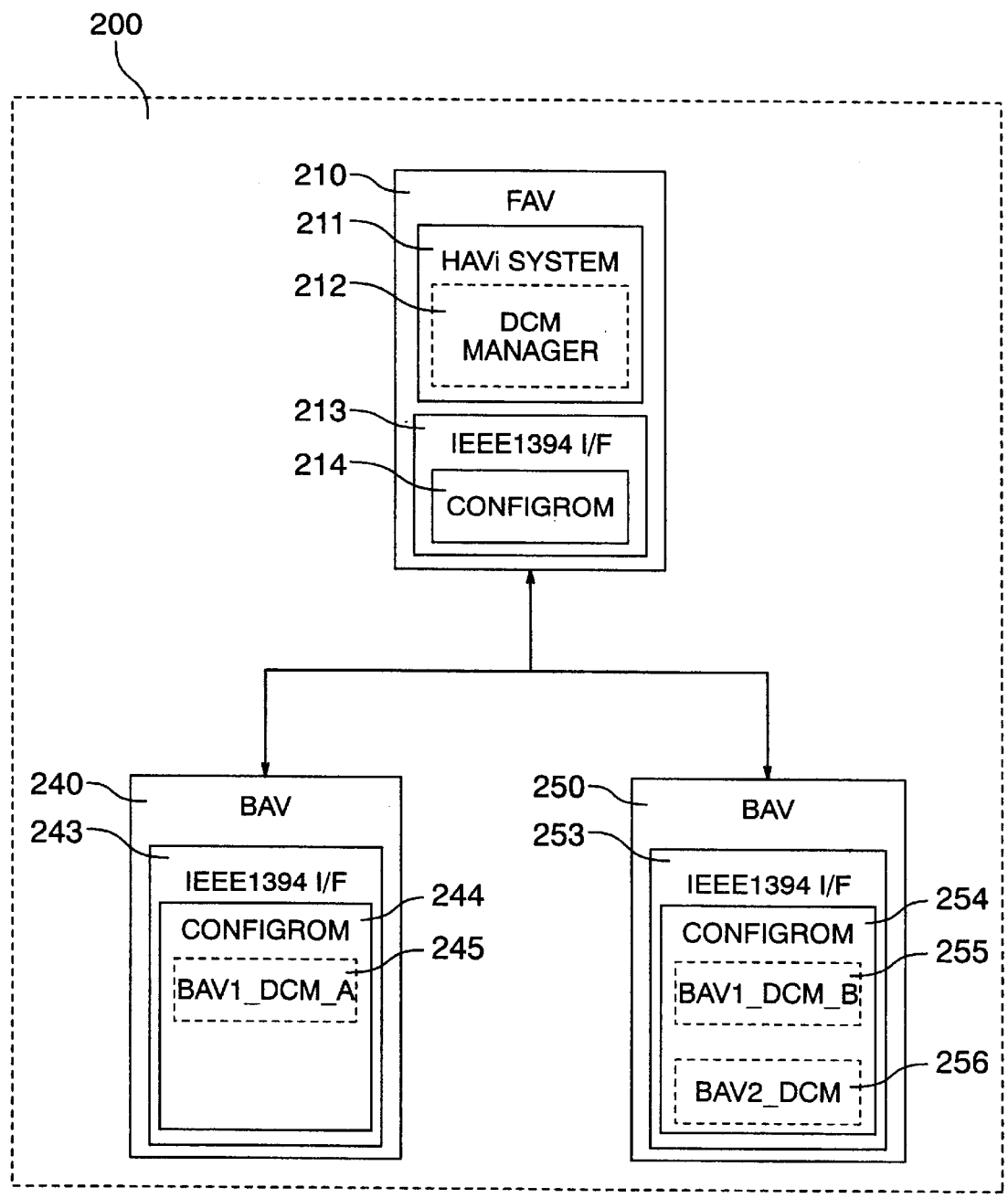
FIG. 1 is a diagram showing an example of the configuration of a network system using a 1394 serial bus according to the present invention.
Figure 5:
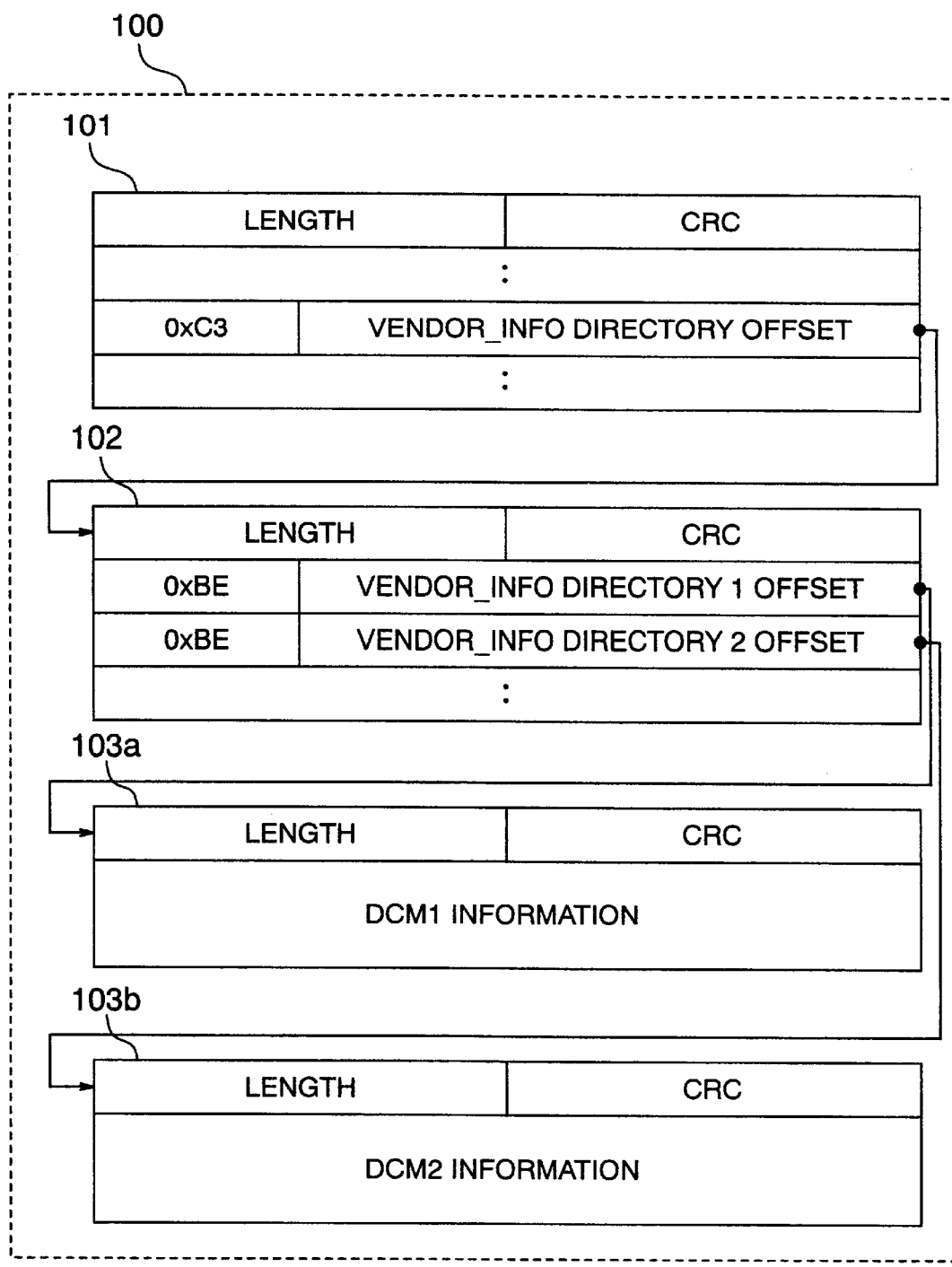
FIG. 5 is a diagram showing the structure of a configROM, composed of HAVi_Unit_Directory and a list of offsets to DCM information indicated by one of the entries, used in an embodiment of the present invention.
Figure 6:
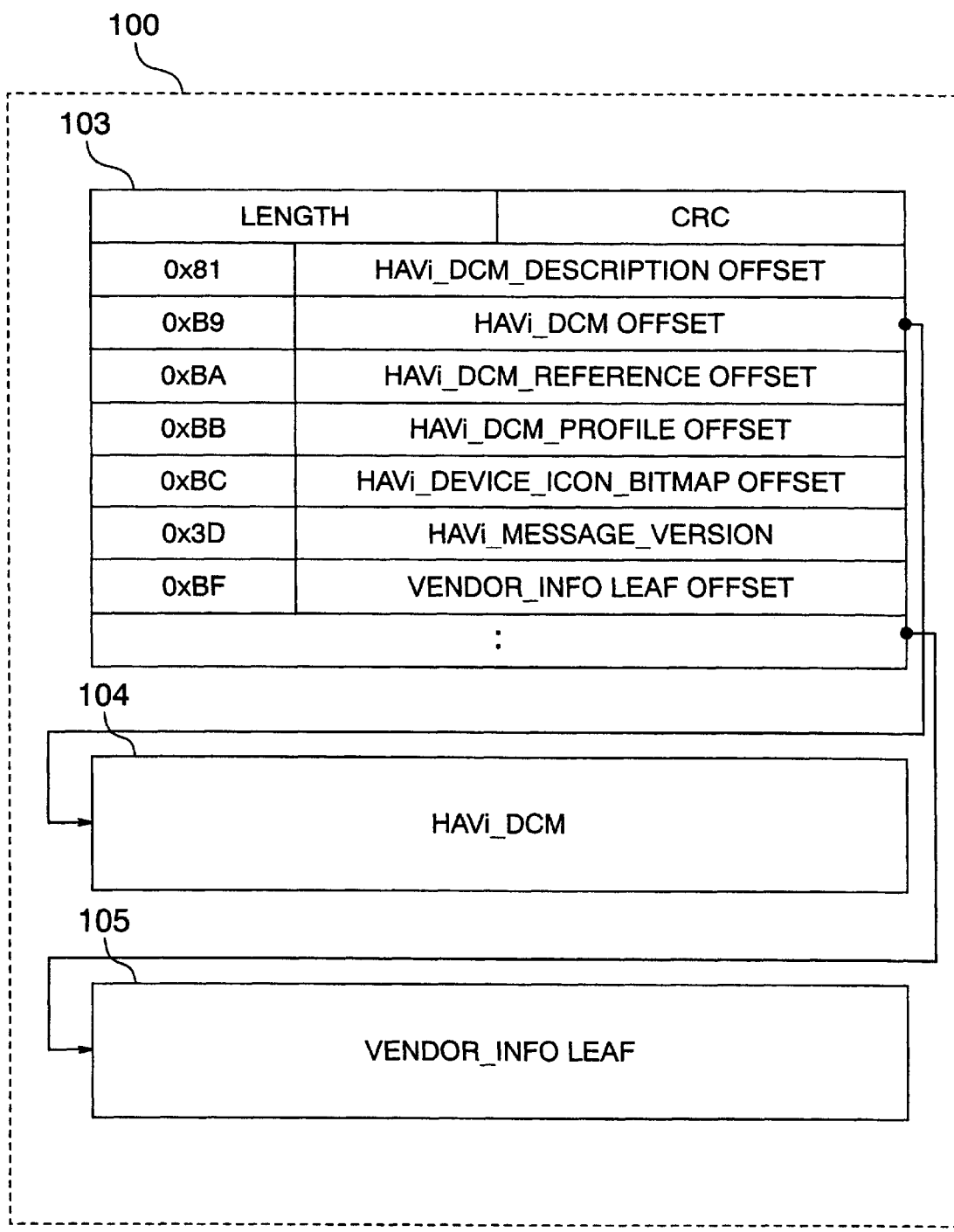
FIG. 6 is a diagram showing the structure of the configROM, composed of a list of offsets to DCM information and its DCM information, used in the embodiment of the present invention.
Figure 7:
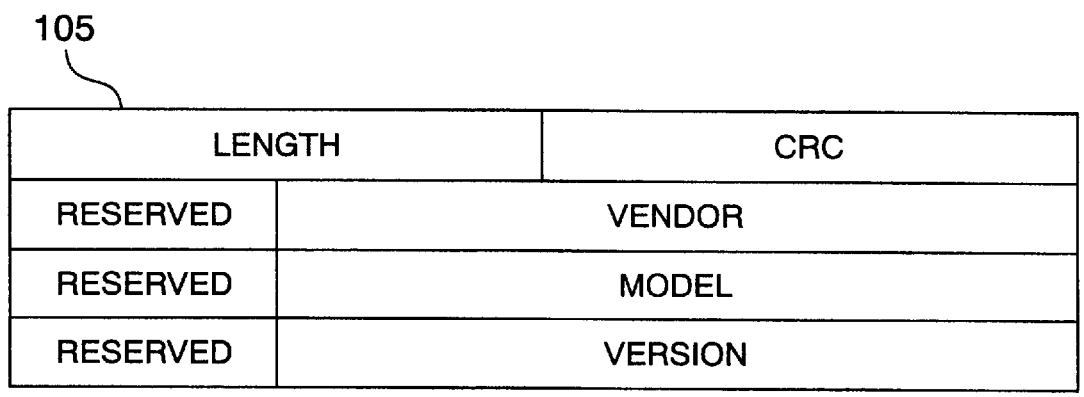
FIG. 7 is a diagram showing the structure of a vendor leaf, in which a code unit for controlling some other device and DCM version information are stored, used in the embodiment of the present invention.

FIG. 1 is a diagram showing the configuration of an HAVi network used in a first embodiment. FIGS. 5–7 are diagrams showing the configuration of the configROM in which DCM information is stored.

In FIG. 1, numeral 200 is an HAVi network system, numeral 210 is an FAV, and numerals 240 and 250 are BAVs. The configuration of each device in FIG. 1 is as follows. Numeral 211 is the HAVi system of the FAV 210, numeral 212 is the DCM Manager, numerals 213, 243, and 253 are IEEE1394 interfaces of the devices, and numerals 214, 244, and 254 are configROMs. In addition, the configROM 244 of the BAV 240 contains BAV1_DCM_a 245 that is the DCM for controlling the BAV itself. Similarly, the configROM 254 of the BAV 250 contains a BAV1_DCM_b 255 that is the DCM for controlling BAV1 and a BAV2_DCM 256 that is the DCM for controlling the BAV itself.

In FIG. 5, numeral 100 is a configROM, and numeral 101 is HAVi_Unit_Directory that contains entries each pointing to a vendor information directory 102. Each entry in the vendor information directory 102 points to the DCM directory of some other device, 103a or 103b.

The vendor information directories 103a and 103b each contain the corresponding DCM information. As shown in the example in FIG. 6, this information includes the description of the DCM (HAVi_DCM_Description), HAVi_DCM 104 that is the DCM code unit itself, a vendor leaf 105 identifying the DCM, and so on.

FIG. 7 shows the vendor leaf 105 is composed of a vendor code identifying the manufacturer, a model code identifying the model, and a version code identifying the version of the code unit.

The configuration of the configROM is described in the IEEE Std 1212-1994. For the values of the vendor directories 102 and 103, the configROM values defined by HAVi as well as the values shown in FIG. 15 are used.

Figure 11:
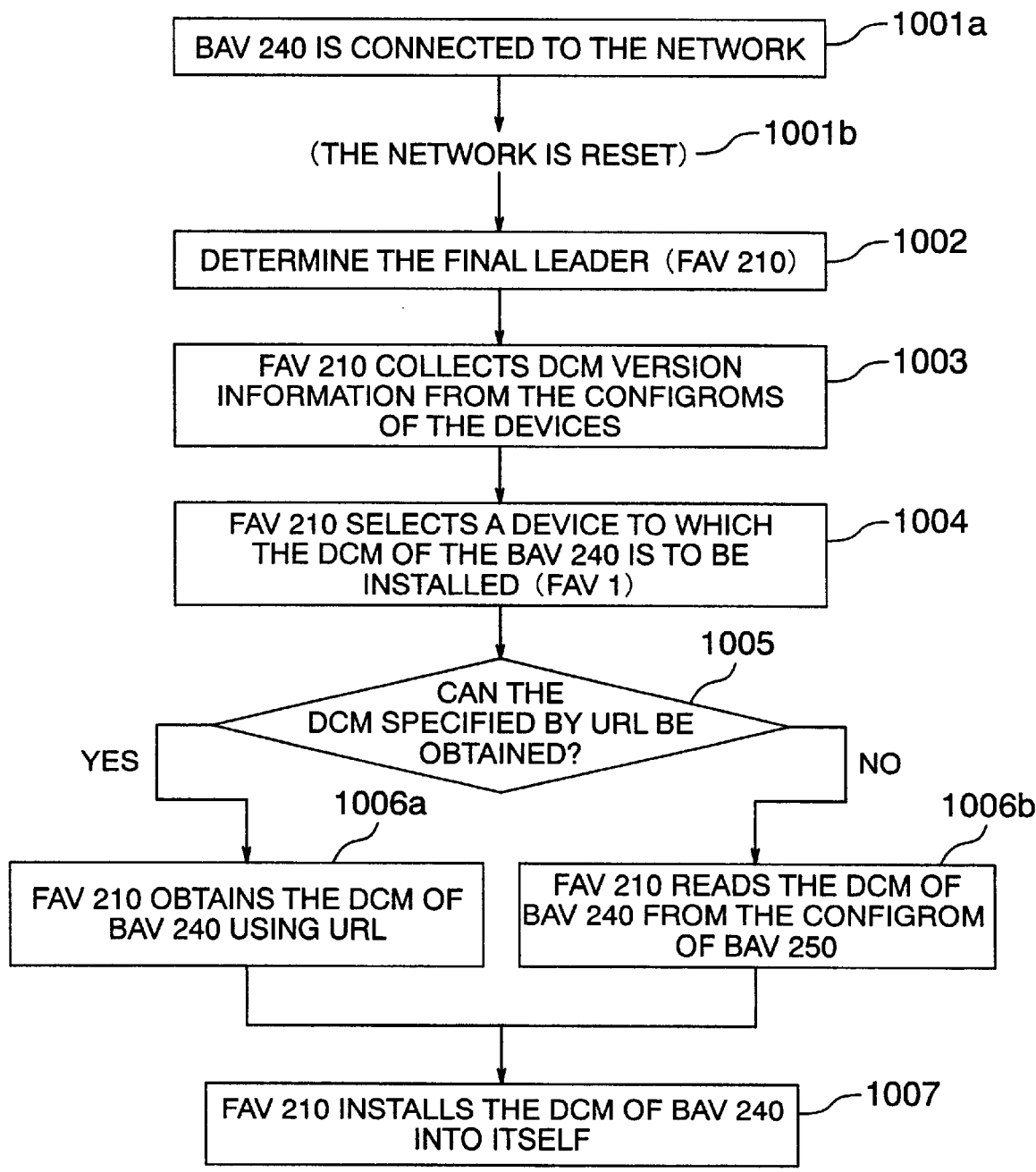
FIG. 11 is a flowchart showing processing executed in an embodiment of the present invention in which a final leader compatible with the technology according to the present invention installs a DCM in itself.

FIG. 11 shows the processing flow of DCM installation. With reference to FIG. 11, the following describes how the DCM Manager 212 of the FAV 210 installs the DCM of the BAV 240 into itself.

First, in step 1001a, the BAV 240 is connected to the network (200). This resets the network (step 1001b).

Next, in step 1002, the DCM Manager 212 of the FAV 210 becomes the final leader.

In step 1003, the DCM Manager 212, which has become the final leader, collects DCM information from the configROMs (214, 244, 254) of the devices. The DCM Manager 212 uses this information to search for the newest DCM of the BAV 240 that is a new device connected to the network. In this example, it is found that the BAV1_DCM_b 255 stored in the BAV 250 is newer than the BAV1_DCM_a 245 that is the DCM stored in the BAV 240. Therefore, the BAV1_DCM_b 255 is selected as the DCM for controlling the BAV 240.

In step 1004, the DCM Manager 212 of the FAV 210 selects itself as the device to which the DCM of the BAV 240 is to be installed.

In step 1005, the DCM Manager 212 of the FAV 210 checks to see if the DCM of the BAV 240 specified by the URL may be obtained. If it may be obtained, control is passed to step 1006a; if not, control is passed to step 1006b.

In step 1006a, the DCM Manager 212 of the FAV 210 uses the URL to obtain the DCM of the BAV 240. Control is then passed to step 1007.

In step 1006b, the DCM Manager 212 of the FAV 210 reads the BAV1_DCM_b 255 from the configROM 254 of the BAV 250. Control is then passed to step 1007.

In step 1007, the DCM Manager 212 of the FAV 210 that has obtained the BAV1_DCM_b 255 installs this DCM into itself.

The above described how the DCM Manager becomes the final leader and how the DCM Manager installs the DCM into itself in this embodiment. As described above, when the DCM in the BAV 250 is newer than the one in the BAV 240, the DCM is updated.

Next, a second embodiment will be described.

Figure 2:
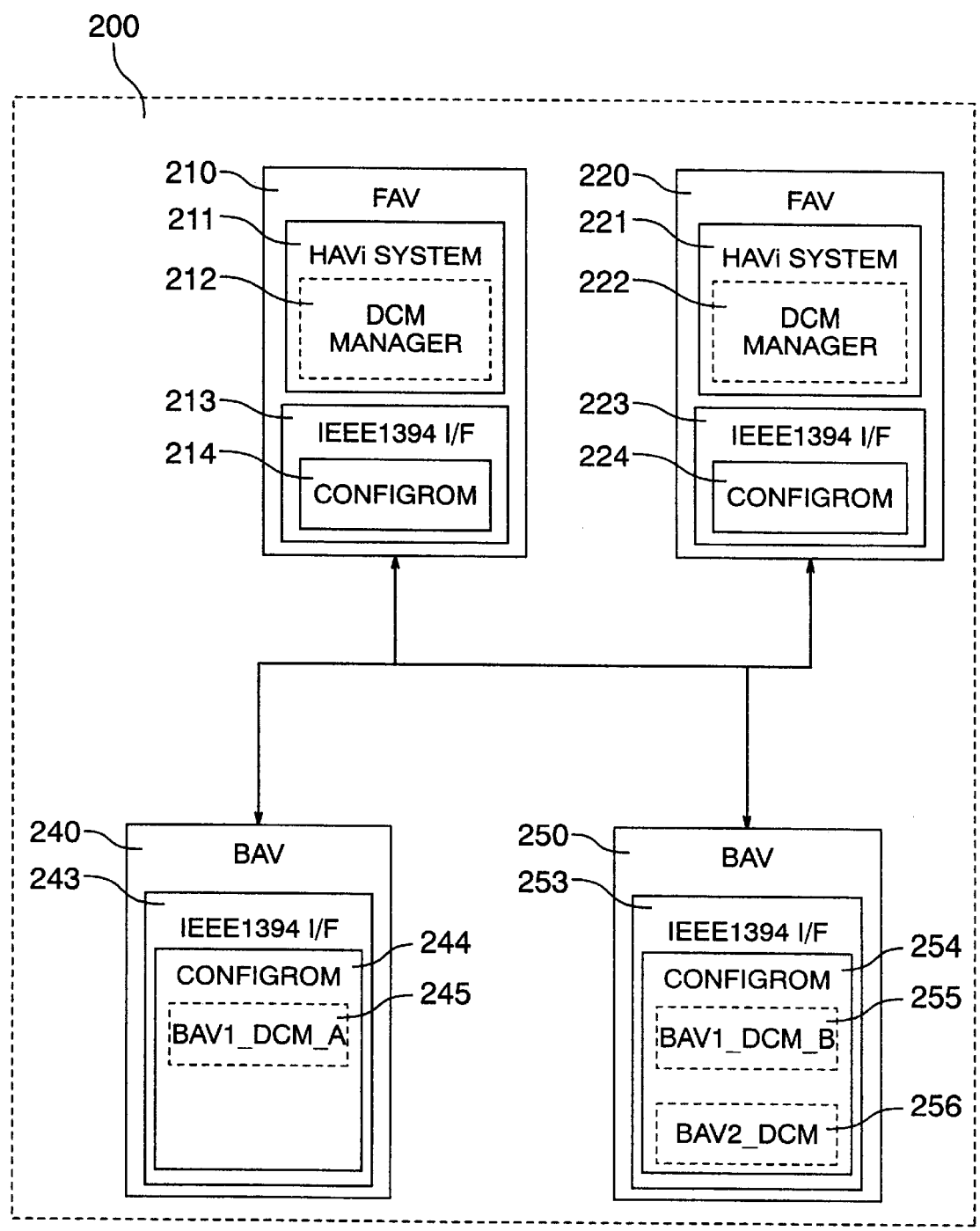
FIG. 2 is a diagram showing an example of the configuration of a network system using the 1394 serial bus according to the present invention.
Figure 12:
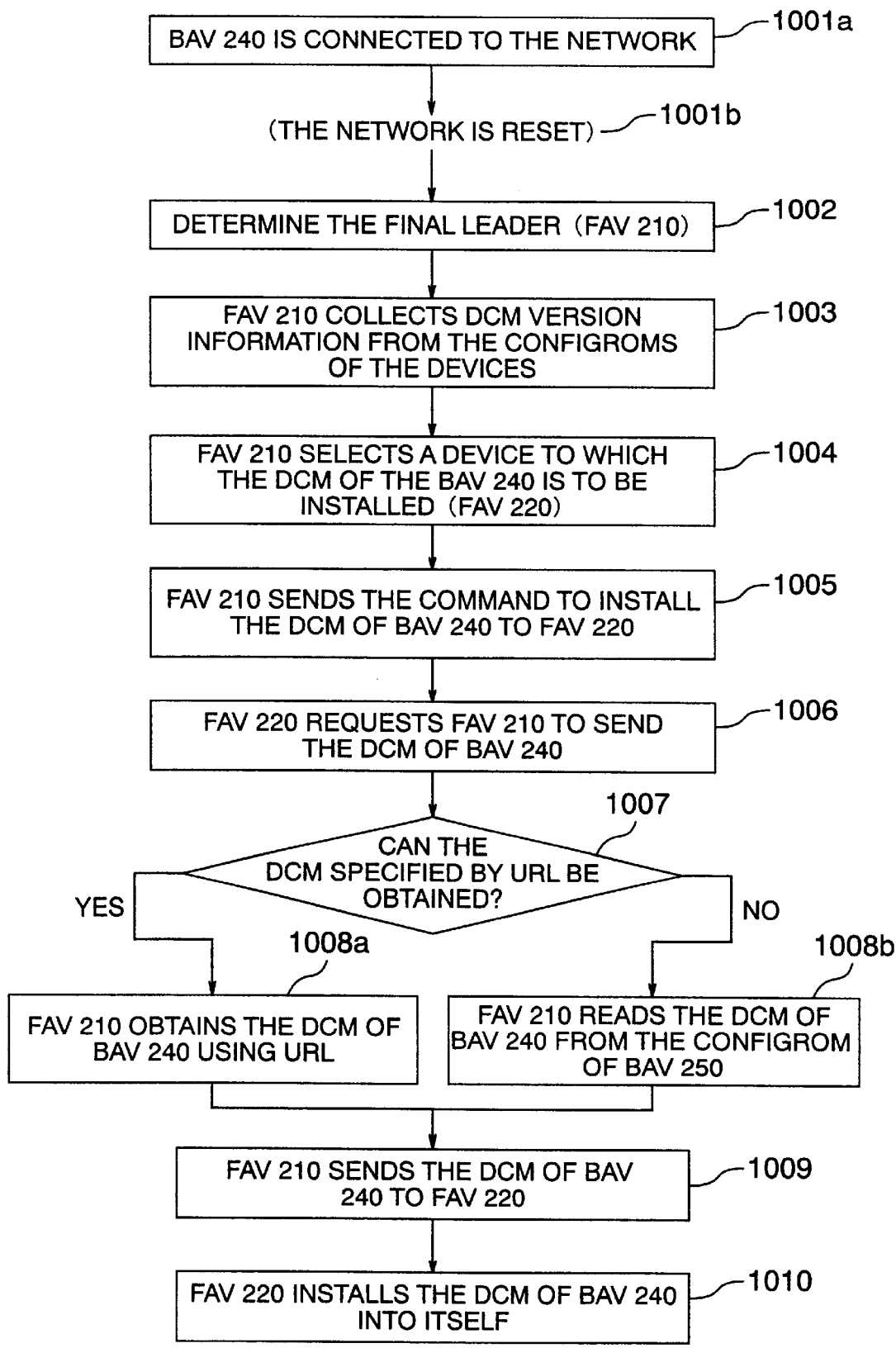
FIG. 12 is a flowchart showing processing executed in an embodiment of the present invention in which a final leader compatible with the technology according to the present invention installs a DCM in some other device.

FIG. 2 is a diagram showing the configuration of a HAVi network used in the second embodiment, and FIG. 12 shows the processing flow of DCM installation.

Referring to FIG. 2, numeral 200 is a HAVi network system similar to the one shown in FIG. 1 except that an FAV 220 is added. The configuration of some devices shown in FIG. 2 is the same as that of the devices of the system shown in FIG. 1. For the FAV 220, numeral 221 is the HAVi system of the FAV 220, numeral 222 is a DCM Manager, numeral 223 is an IEEE1394 interface, and numeral 224 is a configROM.

The configuration of the configROM, similar to that of the configROM in the first embodiment, is as shown in FIGS. 5–7.

Next, with reference to FIG. 12, the following describes how the DCM Manager 212 of the FAV 210 installs the DCM of the BAV 240 to the FAV 220.

First, in step 1001a, the BAV 240 is connected to the network (200). This resets the network (step 1001b).

Next, in step 1002, in response to the network reset, the DCM Manager 212 of the FAV 210 and the DCM Manager 222 of the FAV 220 start negotiation. As a result of the negotiation, the DCM Manager 212 of the FAV 210 becomes the final leader.

In step 1003, the DCM Manager 212, which has become the final leader, collects DCM information from the configROMs (214, 224, 244, 254) of the devices. The DCM Manager 212 uses this information to search for the newest DCM of the new BAV 240 that has been connected to the network. In this example, it is found that the BAV1_DCM_b 255 stored in the BAV 250 is newer than the BAV1_DCM_a 245 that is the DCM stored in the BAV 240. Therefore, the BAV1_DCM_b 255 is selected as the DCM for controlling the BAV 240.

In step 1004, the DCM Manager 212 of the FAV 210 selects the FAV 220 as the device to which the DCM of the BAV 240 is to be installed.

In step 1005, the DCM Manager 212 of the FAV 210 sends DcmManager::DMCommand(INSTALL_URL_PREF), which is a command to install the DCM of the BAV 240, to the FAV 220.

In step 1006, in response to the install command sent from the DCM Manager 212 of the FAV 210 in step 1005, the DCM Manager 222 of the FAV 220 sends the DcmManager::DMGetDcm( ) command to the FAV 210 to request the DCM.

In step 1007, the DCM Manager 212 of the FAV 210 checks to see if the DCM of the BAV 240 specified by a URL may be obtained. If the DCM may be obtained, control is passed to 1008a; if not, control is passed to step 1008b.

In step 1008a, the DCM Manager 212 of the FAV 210 uses the URL to obtain the DCM of the BAV 240. Then, control is passed to step 1009.

In step 1008b, the DCM Manager 212 of the FAV 210 reads the BAV1_DCM_b 255 from the configROM 254 of the BAV 250. Then, control is passed to step 1009.

In step 1009, the DCM Manager 212 of the FAV 210 sends back BAV1_DCM_b 255 to the FAV 220 as the response to DcmManager::DMGetDcm( ).

In step 1010, in response to BAV1_DCM_b 255, the DCM Manager 222 of the FAV 220 installs the DCM into itself.

The above described how the DCM Manager becomes the final leader and how the DCM Manager installs the DCM into another device in this embodiment. As described above, when the DCM in the BAV 250 is newer than the one in the BAV 240, the DCM is updated.

Next, a third embodiment will be described.

Figure 3:
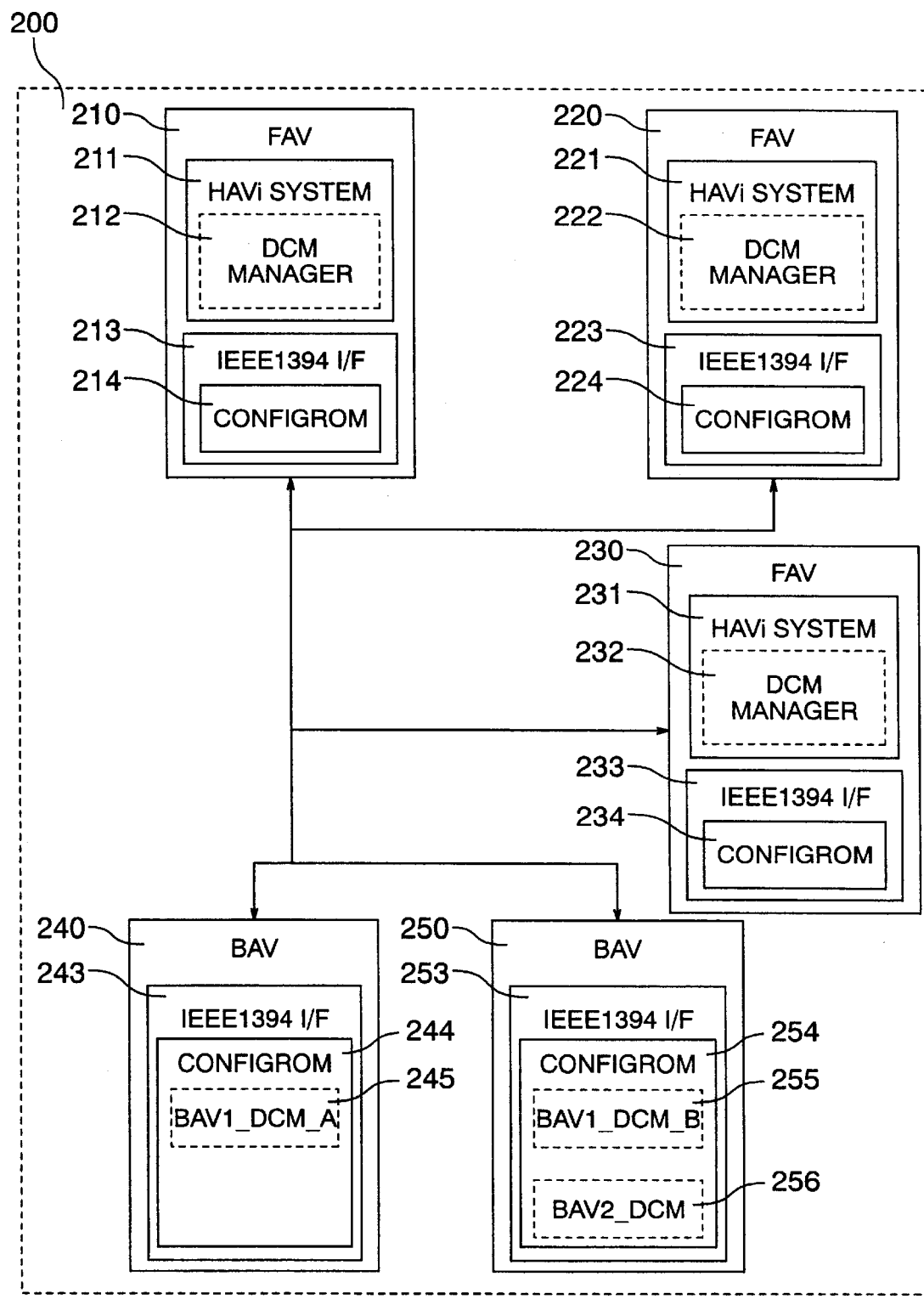
FIG. 3 is a diagram showing an example of the configuration of a network system using the 1394 serial bus according to the present invention.
Figure 13:
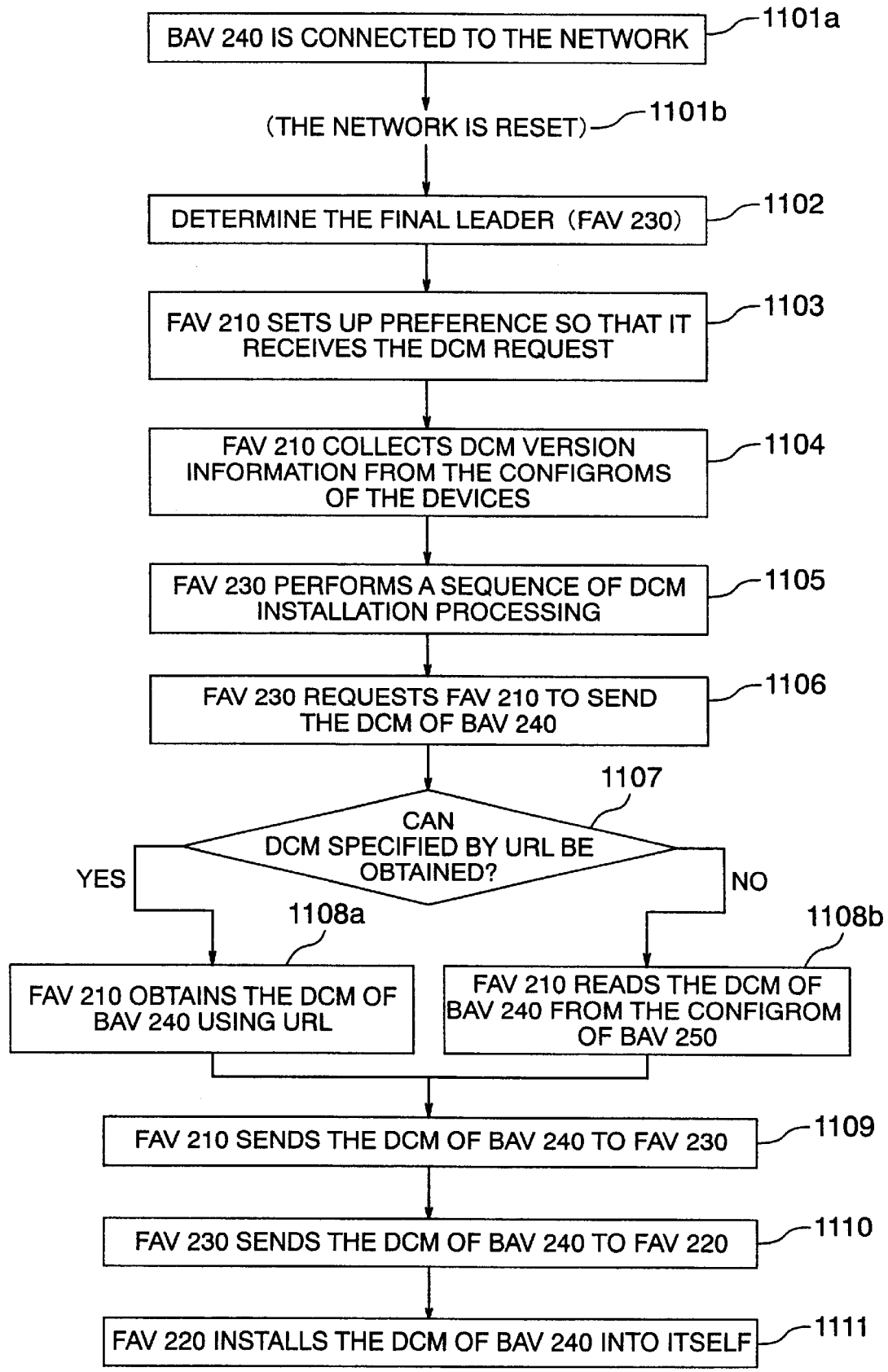
FIG. 13 is a flowchart showing processing executed in an embodiment of the present invention in which a final leader not compatible with the technology according to the present invention installs a DCM.

FIG. 3 is a diagram showing the configuration of a HAVi network used in the third embodiment, and FIG. 13 shows the processing flow of DCM installation.

Referring to FIG. 3, numeral 200 is a HAVi network system similar to the one shown in FIG. 2 except that an FAV 230 is added. In the embodiment, it is assumed that the FAV 230 is not compatible with the technology of the present invention. In addition, the configuration of some devices shown in FIG. 3 is the same as that of the devices of the system shown in FIG. 2. For the configuration of the FAV 230, numeral 231 is the HAVi system of the FAV 230, numeral 232 is a DCM Manager, numeral 233 is an IEEE1394 interface, and numeral 234 is a configROM.

The configuration of the configROM, similar to that of the configROM in the first and second embodiments, is as shown in FIGS. 5–7.

Next, with reference to FIG. 13, processing performed when the DCM Manager 232 of the FAV 230 is selected as the final leader will be described.

First, in step 1101a, the BAV 240 is connected to the network system (200). This resets the network (step 1101b).

Next, in step 1102, in response to the network reset, the DCM Manager 212 of the FAV 210, the DCM Manager 222 of the FAV 220, and the DCM Manager 232 of the FAV 230 start negotiation. As a result of the negotiation, the DCM Manager 232 of the FAV 230 becomes the final leader.

In step 1103, because the DCM Manager 232 of the FAV 230, which has become the final leader, is not compatible with the technology of the present invention, the DCM Manager 212 of FAV 210 compatible with the technology of the present invention first sends the DcmManager::SetPreference(DM_PREFERRED_URL_DEVICE) command to the DCM Manager 232 of the FAV 230 to receive the DCM request.

In step 1104, the DCM Manager 212 collects DCM information from the configROMs (214, 224, 234, 244, 254) of the devices. The DCM Manager 212 uses this information to search for the latest DCM of the new BAV 240 that has been connected to the network. In this example, it is found that the BAV1_DCM_b 255 stored in the BAV 250 is newer than the BAV1_DCM_a 245 that is the DCM stored in the BAV 240. Therefore, the BAV1_DCM_b 255 is selected as the DCM for controlling the BAV 240.

In step 1105, the DCM Manager 232 of the FAV 230 selects the device (FAV 220) to which the DCM is to be installed and then performs DCM installation processing.

In step 1106, in response to the DCM request, which is the DcmManager::DMGetDcm( ) command, from the DCM Manager 222 of the FAV 220, the DCM Manager 232 of the FAV 230 sends the DcmManager::DMGetDcm( ) command to the FAV 210 according to the setting specified in step 1103 to request the DCM of the BAV 240.

In step 1107, the DCM Manager 212 of the FAV 210 checks to see if the DCM of the BAV 240 specified by a URL may be obtained. If the DCM may be obtained, control is passed to 1108a; if not, control is passed to step 1108b.

In step 1108a, the DCM Manager 212 of the FAV 210 uses the URL to obtain the DCM of the BAV 240. Then, control is passed to step 1109.

In step 1108b, the DCM Manager 212 of the FAV 210 reads the BAV1_DCM_b 255 from the configROM 254 of the BAV 250. Then, control is passed to step 1109.

In step 1109, the DCM Manager 212 of the FAV 210 sends back BAV1_DCM_b 255 to the FAV 230 as the response to DcmManager::DMGetDcm( ).

In step 1110, the DCM Manager 232 of the FAV 230 also sends back BAV1_DCM_b 255 to the FAV 220 as the response to DcmManager::DMGetDcm( ).

In step 1111, upon receiving BAV1_DCM_b 255, the DCM Manager 222 of the FAV 220 installs the DCM into itself.

The above described the operation performed when a DCM Manager not compatible with the technology of the present invention acts as the final leader. As described above, the present invention has advantages even when an FAV in which the method of the present invention is not installed is connected to a network.

In the above embodiment, although the DCM Manager 212 of the FAV 210 installs the DCM of the BAV 240 to some other device, it is also possible for the FAV 210 to install the DCM into itself as in the first embodiment even when the DCM Manager acting as the final leader is not compatible with the technology of the present invention.

In the above embodiments, the FAV 210 obtains DCM code unit 255 from the BAV 250 and installs it directly or passes it to some other FAV for installation. However, it is also possible to send the latest DCM code unit 255 obtained by the FAV 210 to the BAV 240 to rewrite the existing code unit and to store the rewritten code unit into configROM. This means that, even if the BAV 250 that provides the code unit is disconnected from the HAVi network 200, the latest DCM code unit 255 stored in the BAV 240 may be used.

Next, a fourth embodiment of the present invention will be described.

Figure 4:
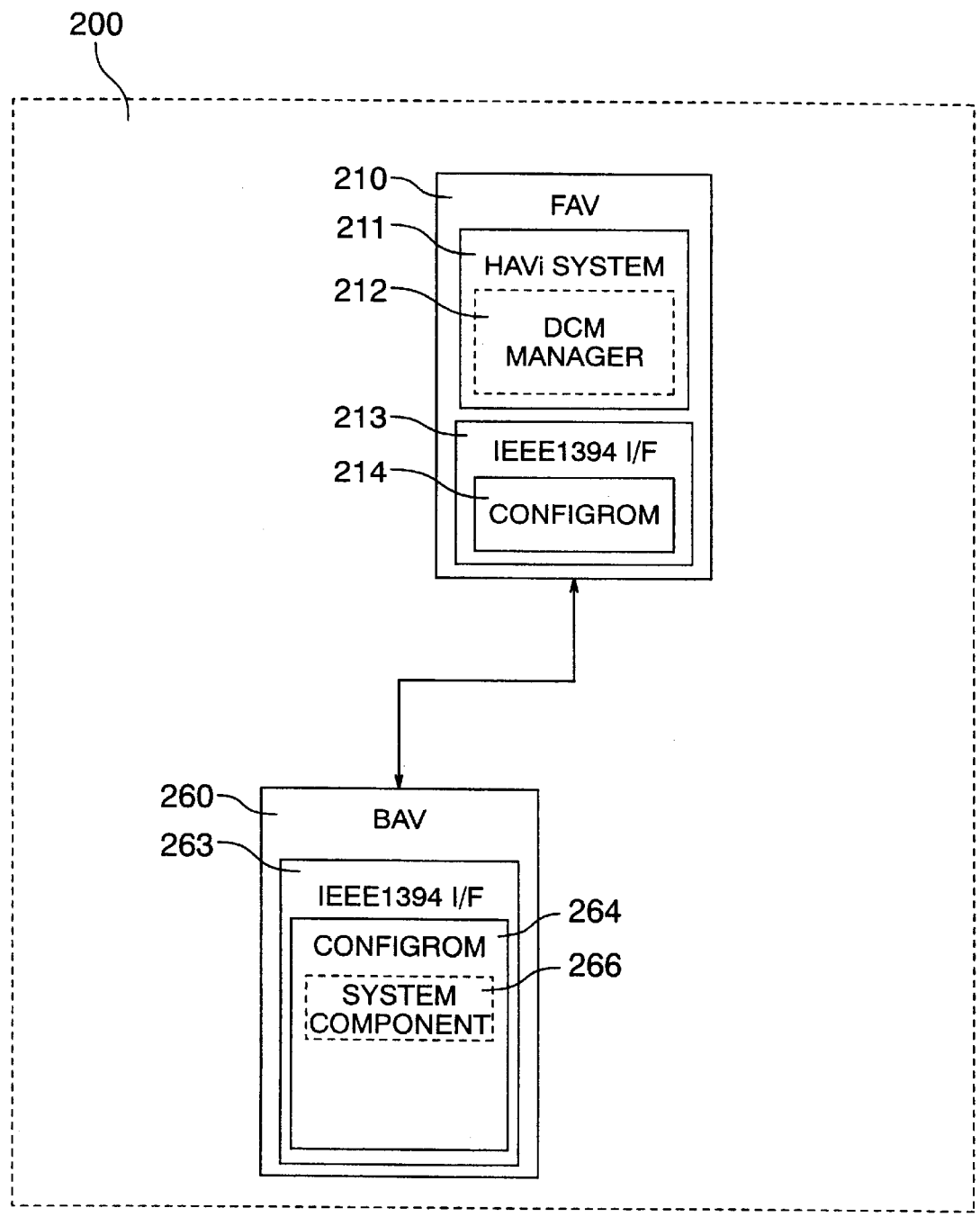
FIG. 4 is a diagram showing an example of the configuration of a network system using the 1394 serial bus according to the present invention.
Figure 14:
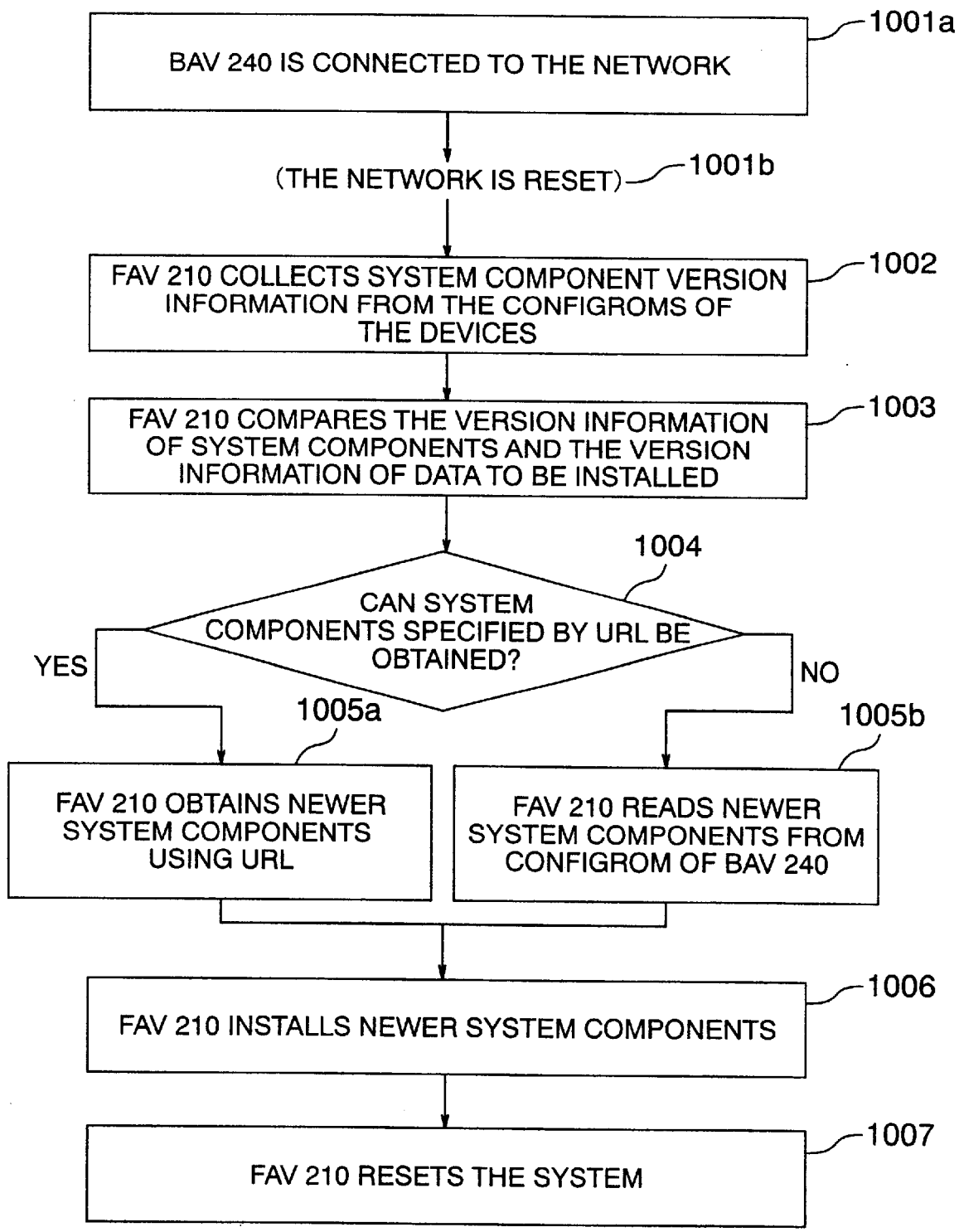
FIG. 14 is a flowchart showing processing executed in an embodiment of the present invention when system components are updated.

With reference to FIG. 14, the following descries how the FAV 210 in the network system shown in FIG. 4 downloads data (266), which will be used for updating its own software from the configROM 264 of the BAV 260, and installs it.

FIG. 4 is a diagram showing the configuration of an HAVi network used in the fourth embodiment.

Referring to FIG. 4, numeral 200 is an HAVi network system, numeral 210 is an FAV, and numeral 260 is a BAV. The configuration of some devices shown in FIG. 4 is the same as that of the devices shown in FIG. 1. For the BAV 260, numeral 263 is an IEEE1394 interface, numeral 264 is a configROM, and numeral 266 is system component update data.

The configROM, with the same structure as that of the DCM information shown in FIGS. 5–7 and FIGS. 8–10, contains system component update data, their version numbers, and detailed information including a text-based description. The version numbers and the detailed information including the description may be stored separately, or the version numbers may be included in the detailed information including the description. Various forms are possible; for example, the version numbers are stored in a place other than the configROM or only the detailed information or the version numbers are provided.

FIG. 14 is a diagram showing the processing flow of system component installation. With reference to FIG. 14, the following describes how the FAV 210 downloads the system component update data 266 stored in the configROM 264 of the BAV 260 and installs it.

First, in step 1001a, the BAV 260 is connected to the network (200). This resets the network (step 1001b).

Next, in step 1002, the FAV 210 first obtains system component information from the configROM 264 of the BAV 260.

In step 1003, the FAV 210 uses the obtained system component information to compare the version information of system component update data with the version information of the currently installed system components. In this example, it is found that the system components stored in the configROM of the BAV 260 is newer than the currently installed system components. Therefore, the FAV selects the newer system components for installation.

In step 1004, the FAV 210 checks if the system components specified by the URL may be obtained. If the system components may be obtained, control is passed to step 1005a; if not, control is passed to step 1005b.

In step 1005a, the FAV 210 uses the URL to obtain the newer system components. Control is then passed to step 1006.

In step 1005b, the FAV 210 reads system component update data 266 from the configROM 264 of the BAV 260. Control is then passed to step 1006.

In step 1006, the FAV 210 that has obtained the newer system components installs the system components in itself.

In step 1007, the FAV 210 resets (reboots) its own system so that the newer system components are used.

The above described how the FAV downloads system component update data from other devices to update its own system components. As described above, when the system components in some other device are newer than those currently stored, the system components are updated.

In the above embodiments, DCM information is stored using the directory and the leaves of Vendor_Info. Another method to store DCM information is to define HAVi_DCM_List_Unit_Directory. This method will be described with reference to FIGS. 8–10.

Figure 8:
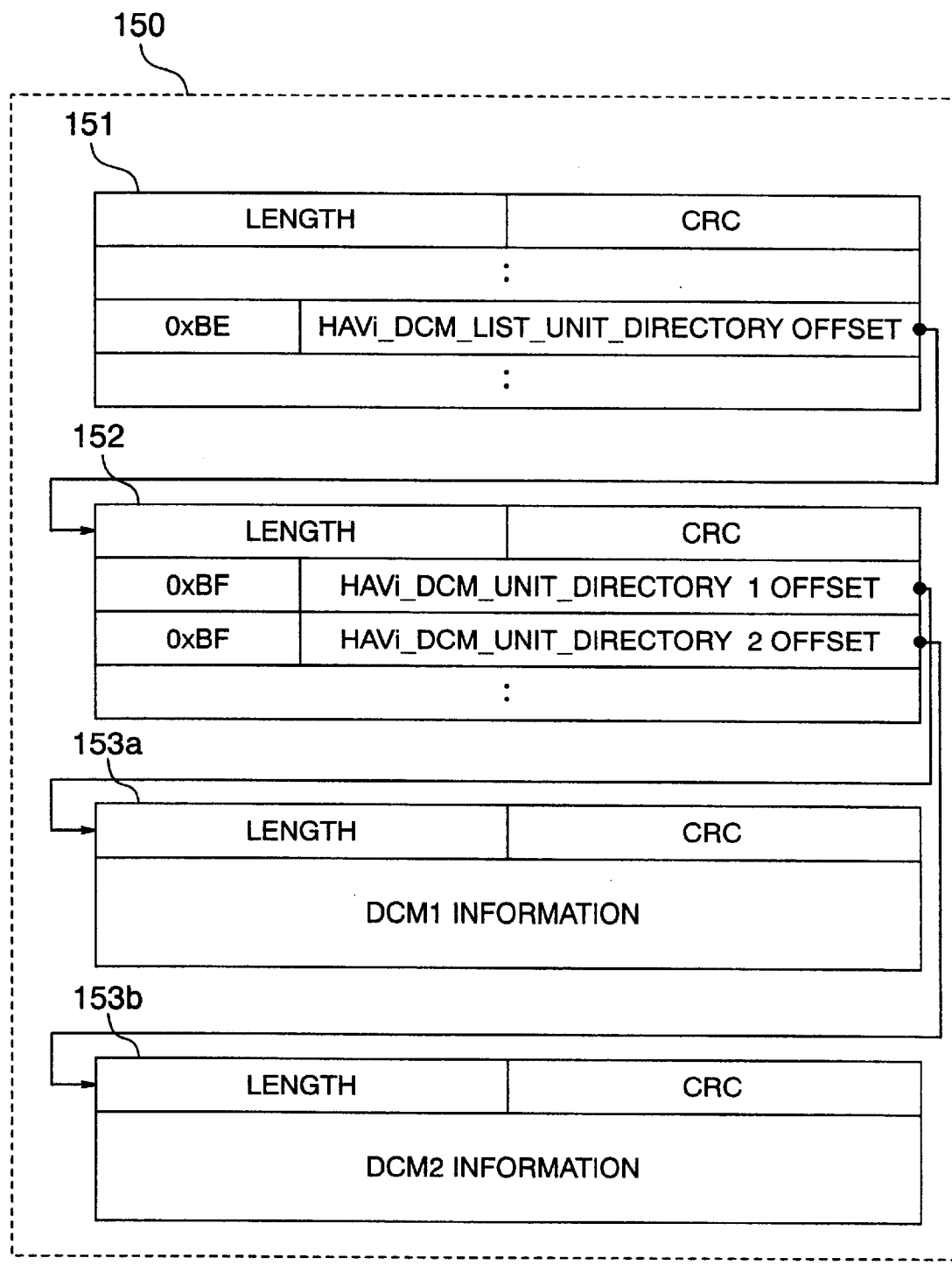
FIG. 8 is a diagram showing the structure of the configROM, composed of HAVi_Unit_Directory and a list of offsets to DCM information indicated by one of the entries, used in an embodiment of the present invention.
Figure 9:
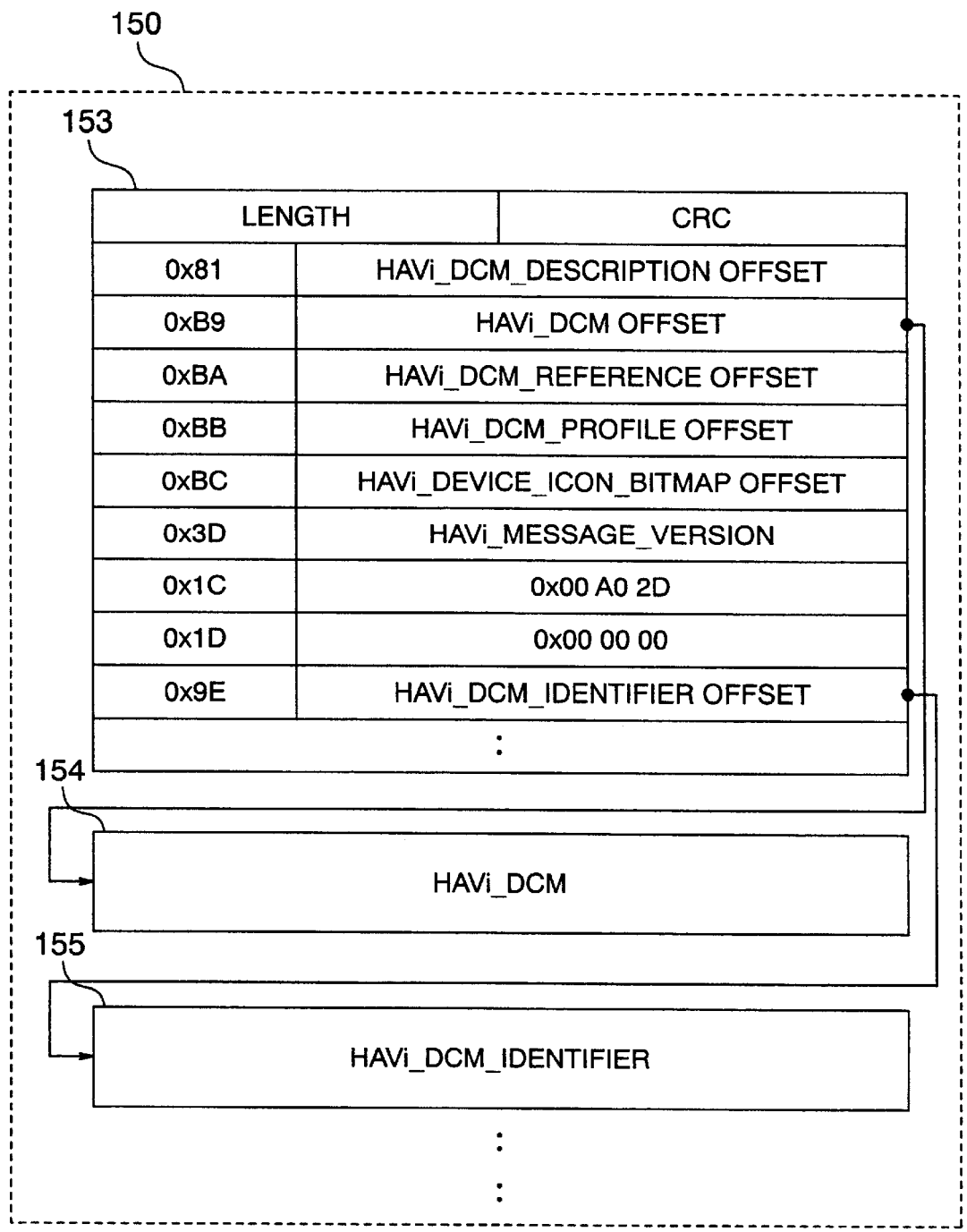
FIG. 9 is a diagram showing the structure of the configROM, composed of a list of offsets to DCM information and its DCM information, used in the embodiment of the present invention.
Figure 10:
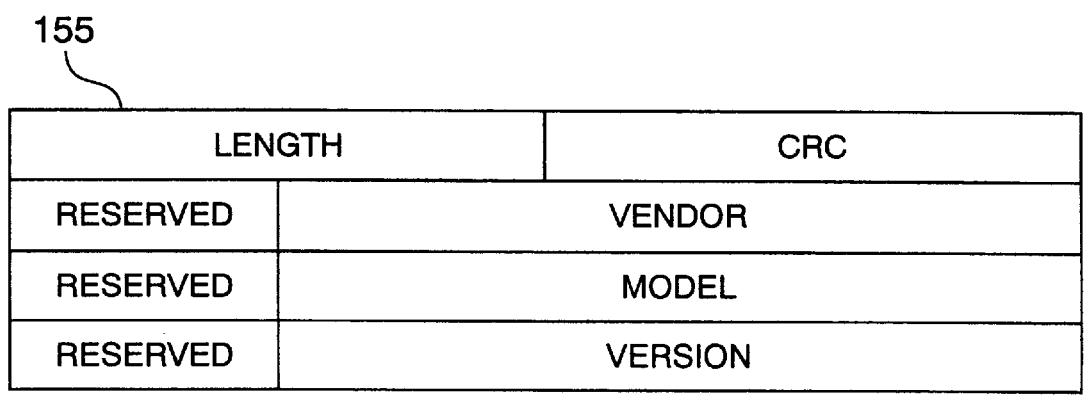
FIG. 10 is a diagram showing the structure of HAVi_DCM_Identifier, in which a code unit for controlling some other device, DCM version information, and so on are stored, used in an embodiment of the present invention.

In FIGS. 8–10, numeral 150 is a configROM and numeral 151 is HAVi_Unit_Directory that contains entries each pointing to an entry defined in HAVi_DCM_List_Unit_Directory 152. The entries in the HAVi_DCM_List_Unit_Directory 152 point to HAVi_DCM_Unit_Directory, 153a and 153b, which are the DCM directories of other devices.

A newly defined HAVi_DCM_Unit_Directory 153 contains the corresponding DCM information. For example, this information includes the description of the DCM (HAVi_DCM_Description), HAVi_DCM 154 that is the DCM code unit itself, an HAVi_DCM_Identifier 155 that identifies the DCM, and so on.

The HAVi_DCM_Identifier 155 is composed of a vendor code identifying the manufacturer, a model code identifying the model, and a version code identifying the version of the code unit.

The configuration of the configROM is described in the IEEE Std 1212-1994. For the values of the HAVi_DCM_List_Unit_Directory 152 and HAVi_DCM_Unit_Directory 153, the configROM values defined by the HAVi as well as the newly defined values shown in FIG. 16 are used.

System component information may also be stored in a structure defined in the same manner.

In the system described above, it is also possible to disclose the DCMs to be installed as well as system component information so that the user may select whether or not to install them. In such a case, the data structures and procedure similar to those described in the above embodiments are used. Before installing DCMs or system components, it is necessary to display detailed information on the user terminal to allow the user to select whether to install them. The detailed information displayed at this time includes version numbers and text description.

In the above embodiments, the devices are connected via a HAVi network using the IEEE1394 interface. Other home network or wide area network technologies may also be used.

In the above embodiments, the devices are denoted as "FAV" or "BAV". More specifically, FAVs include a set-top box, a digital TV sets, and so on, while BAVs include a video deck, a DVD player, and so on.

DCM code units and system components are all obtained from a BAV on the HAVi network 200 in the above embodiments. It is also possible to obtain a DCM code unit from a wide area network such as the Internet for comparison with that stored in each device.

Even when a code unit (DCM) that is data for controlling a device is modified and its version is updated, the method according to the present invention allows a device with an older DCM to use a new-version DCM. When updating the DCM, there is no need for the device to be connected to a network, such as the Internet. The system components may also be updated.

While the preferred form of the present invention has been described, it is to be understood that the present invention is not limited to the embodiments but that modifications will be apparent to those skilled in the art without departing from the spirit of the present invention.

What is claimed is:

1. A control system in which a controller and a plurality of controlled devices are connected by a network:
   wherein a first controlled device includes, in an externally readable memory area, data for controlling itself as well as data for controlling a second controlled device;
   wherein the controller obtains the data for controlling the second controlled device from the first controlled device; and
   wherein the data for controlling the second controlled device stored in the externally readable memory area of the first controlled device is newer than data for controlling the second controlled device stored in the second controlled device.

2. The control system according to claim 1, wherein the data for controlling the second controlled device stored in the externally readable memory area of the first or in the second controlled device includes a version number.

3. A control system in which a controller and a plurality of controlled devices are connected by a network:
   wherein a first controlled device includes, in an externally readable memory area, data for controlling itself as well as data for controlling a second controlled device;
   wherein the controller obtains the data for controlling said second controlled device from said first controlled device;
   wherein the controlled devices each includes a version number and a data description; and
   wherein the controller obtains the version number or the data description, and if the data can be obtained from more than one of the controlled devices, compares the version number or detailed information among the controlled devices to select the data that is newer.

4. The control system according to claim 3 wherein the controller generates a program to control the first controlled device or the second controlled device, the program running in the controller and being generated from the data for controlling the first or the second controlled device stored in the externally readable memory area of the first controlled device.

5. The control system according to claim 3 wherein the first controlled device receives the data for controlling itself from a predetermined controller and stores the data in its externally readable memory area.

6. A control system in which a controller and a controlled device are connected by a network:
   wherein the controlled device includes, in an externally readable memory area, data for controlling itself and a second controlled device and includes a module for updating a program running in the controller;
   wherein the controller obtains the module for updating the program running in the controller from the externally readable memory area, updates the program with the obtained module, and controls the controlled device or the second controlled device;
   wherein the controlled devices each includes a version number and information including a data description; and
   wherein the controller obtains the version number or the information and, if the data can be obtained from more than one of the controlled devices, compares the version number or the information of the controlled devices to select the data that is newer.

7. A control system in which a controller and a plurality of controlled devices are connected by a network:
   wherein a first controlled device includes, in an externally readable memory area, data for controlling itself as well as data for controlling a second controlled device;
   wherein the controller obtains the data for controlling the second controlled device from the first controlled device;
   wherein the first controlled device includes data version information and information including a data description in its externally readable memory area; and
   wherein the controller obtains the data version information or the information and displays them to allow a user to select whether to use the data.

8. A controlled device connected to a network and having an externally readable memory area:
   wherein the controlled device includes data for controlling itself and data for controlling a further controlled device;
   wherein the data for controlling the further controlled device is obtained by a controller connected to the network;
   wherein the first controlled device includes a data version number or information including a data description; and
   wherein the controller obtains the version number or the information and displays it to allow a user to select whether to use the data.

9. The controlled device according to claim 8, wherein the controlled device receives the data for controlling itself from a predetermined controller and stores the received data in an externally readable memory area thereof.

10. A controlled device connected to a network and having an externally readable memory area:
    wherein the controlled device includes, in the externally readable memory area, data for controlling itself or a further controlled device and includes a module for updating a program running in a controller connected to the network;
    wherein the module for updating the program running in the controller is obtained by the controller connected to the network and the controlled device is controlled by the updated program;
    wherein the controlled device includes a data version number or information including a data description in the externally readable memory area; and wherein the controller obtains the version number or the information and displays it to allow a user to select whether to use the data.

11. A controller connected to a network, wherein, from a controlled device connected to the network and including data for controlling itself and data for controlling some other controlled device in an externally readable memory area, the controller obtaining the data for controlling the other controlled device connected to the network; and wherein the data obtained from the controlled device includes a data version number or information including a data description and, if the data may be obtained from a plurality of controlled devices, the controller compares the version numbers or information between the devices and selects the newer data.

12. A controller connected to a network, wherein, from a controlled device connected to the network and including data for controlling itself and data for controlling some other controlled device in an externally readable memory area, the controller obtains the data for controlling the other controlled device connected to the network;

wherein the obtained data includes a data version number or information including a data description and the controller displays the obtained version number or information to allow a user to select whether to use the data.

13. A method for use in a control system in which a controller and a plurality of controlled devices are connected by a network in which a first controlled device includes, in an externally readable memory area, data for controlling itself as well as data for controlling a second controlled device, the method comprising:

obtaining data for controlling the second controlled device from the first controlled device;

controlling to second controlled device based on the obtained data; and wherein the controlled devices each includes data a version number and information including a data description in the externally readable memory area and wherein the controller obtains the version number or information and, if the data can be obtained from more than one of the controlled devices, compares the version number or detailed information among the controlled devices to select the data that is newer.

* * * * *